US008393001B1

(12) United States Patent
Libenzi et al.

(10) Patent No.: US 8,393,001 B1
(45) Date of Patent: Mar. 5, 2013

(54) SECURE SIGNATURE SERVER SYSTEM AND ASSOCIATED METHOD

(75) Inventors: Davide Libenzi, Hillsboro, OR (US); Victor Kouznetsov, Aloha, OR (US)

(73) Assignee: McAfee, Inc., Sanata Clara, CA (US)

( * ) Notice: Subject to any disclaimer, the term of this patent is extended or adjusted under 35 U.S.C. 154(b) by 1481 days.

(21) Appl. No.: 10/206,288

(22) Filed: Jul. 26, 2002

(51) Int. Cl.
*H04L 9/32* (2006.01)

(52) U.S. Cl. .......... 726/26; 713/176; 717/168; 717/169; 717/170; 717/171; 717/172

(58) Field of Classification Search .................. 713/176; 717/168–172, 177; 726/26–30
See application file for complete search history.

(56) References Cited

U.S. PATENT DOCUMENTS

| | | | | |
|---|---|---|---|---|
| 5,164,988 A | * | 11/1992 | Matyas et al. ................ | 713/156 |
| 5,534,855 A | * | 7/1996 | Shockley et al. ........... | 340/5.52 |
| 5,604,801 A | * | 2/1997 | Dolan et al. .................. | 713/159 |
| 5,649,099 A | * | 7/1997 | Theimer et al. ................... | 726/4 |
| 5,677,953 A | * | 10/1997 | Dolphin ......................... | 705/51 |
| 5,724,425 A | | 3/1998 | Chang et al. .................... | 705/52 |
| 5,757,925 A | | 5/1998 | Faybishenko .................. | 380/49 |
| 5,872,848 A | * | 2/1999 | Romney et al. ............... | 713/176 |
| 5,894,516 A | * | 4/1999 | Brandenburg .................. | 705/51 |
| 5,948,104 A | * | 9/1999 | Gluck et al. .................... | 726/24 |
| 5,956,403 A | | 9/1999 | Lipner et al. .................... | 380/21 |
| 5,982,890 A | * | 11/1999 | Akatsu ................................ | 1/1 |
| 5,991,406 A | | 11/1999 | Lipner et al. .................... | 380/21 |
| 6,049,671 A | * | 4/2000 | Slivka et al. .................. | 717/173 |
| 6,052,531 A | * | 4/2000 | Waldin et al. ................. | 717/170 |
| 6,085,322 A | * | 7/2000 | Romney et al. ............... | 713/176 |
| 6,134,660 A | | 10/2000 | Boneh et al. ................... | 713/193 |
| 6,138,236 A | * | 10/2000 | Mirov et al. ...................... | 726/26 |
| 6,185,678 B1 | * | 2/2001 | Arbaugh et al. .................. | 713/2 |
| 6,223,291 B1 | * | 4/2001 | Puhl et al. ......................... | 726/28 |
| 6,249,585 B1 | | 6/2001 | McGrew et al. ............. | 380/286 |
| 6,269,456 B1 | * | 7/2001 | Hodges et al. .................. | 714/38 |
| 6,272,632 B1 | | 8/2001 | Carman et al. ................ | 713/168 |
| 6,275,941 B1 | * | 8/2001 | Saito et al. ........................ | 726/2 |
| 6,285,991 B1 | * | 9/2001 | Powar ............................. | 705/76 |

(Continued)

FOREIGN PATENT DOCUMENTS

| | | |
|---|---|---|
| WO | 98/47260 | 10/1998 |
| WO | 01/09300 | 12/2001 |

(Continued)

OTHER PUBLICATIONS

Alfred J. Menezes, Paul C. van Oorschot and Scott A. Vanstone, Handbook of Applied Cryptography, Aug. 2001, CRC Press, 5th Edition, pp. 544-551, 559-561, 581-586.*

(Continued)

*Primary Examiner* — Tamara Teslovich
(74) *Attorney, Agent, or Firm* — Wong, Cabello, Lutsch, Rutherford & Brucculeri, LLP

(57) ABSTRACT

A system, method and computer program product are provided for securely generating signatures. Initially received is a request to generate a signature at a secure server. Then, the signature is automatically generated at the secure server utilizing a private key stored at the secure server. The signature is then transmitted from the secure server. Such signature is capable of being used to verify an authenticity of an update (i.e. data and/or software) for a computer utilizing a public key.

18 Claims, 4 Drawing Sheets

U.S. PATENT DOCUMENTS

| | | | |
|---|---|---|---|
| 6,314,190 B1 | 11/2001 | Zimmermann | 380/282 |
| 6,317,829 B1 | 11/2001 | Van Oorschot | 713/155 |
| 6,336,186 B1 | 1/2002 | Dyksterhouse et al. | 713/156 |
| 6,378,069 B1* | 4/2002 | Sandler et al. | 713/153 |
| 6,442,686 B1 | 8/2002 | McArdle et al. | 713/151 |
| 6,546,492 B1* | 4/2003 | Walker et al. | 726/3 |
| 6,611,916 B1* | 8/2003 | Cacace-Bailey et al. | 726/6 |
| 6,678,741 B1* | 1/2004 | Northcutt et al. | 709/248 |
| 6,799,197 B1* | 9/2004 | Shetty et al. | 709/203 |
| 6,976,163 B1* | 12/2005 | Hind et al. | 713/156 |
| 7,194,618 B1* | 3/2007 | Suominen | 713/155 |
| 7,266,845 B2* | 9/2007 | Hypponen | 726/24 |
| 7,302,487 B2* | 11/2007 | Ylonen et al. | 709/229 |
| 7,500,104 B2* | 3/2009 | Goland | 713/175 |
| 2001/0023416 A1* | 9/2001 | Hosokawa | 705/51 |
| 2001/0054087 A1* | 12/2001 | Flom et al. | 709/218 |
| 2002/0046350 A1* | 4/2002 | Lordemann et al. | 713/201 |
| 2002/0078354 A1* | 6/2002 | Sandhu et al. | 713/171 |
| 2002/0112161 A1* | 8/2002 | Thomas et al. | 713/176 |
| 2002/0169953 A1* | 11/2002 | Moharram et al. | 713/151 |
| 2002/0174422 A1* | 11/2002 | Kelley et al. | 717/178 |
| 2003/0028542 A1* | 2/2003 | Muttik et al. | 707/100 |
| 2003/0051236 A1* | 3/2003 | Pace et al. | 717/177 |
| 2003/0065936 A1* | 4/2003 | Wray | 713/200 |
| 2003/0066884 A1* | 4/2003 | Reddy et al. | 235/382.5 |
| 2003/0074567 A1* | 4/2003 | Charbonneau | 713/186 |
| 2003/0074581 A1* | 4/2003 | Hursey et al. | 713/201 |
| 2003/0217163 A1* | 11/2003 | Lagerweij et al. | 709/229 |
| 2004/0039911 A1* | 2/2004 | Oka et al. | 713/175 |
| 2004/0039916 A1* | 2/2004 | Aldis et al. | 713/177 |
| 2004/0111608 A1* | 6/2004 | Oom Temudo de Castro et al. | 713/156 |
| 2004/0158742 A1* | 8/2004 | Srinivasan et al. | 713/201 |
| 2005/0074126 A1* | 4/2005 | Stanko | 380/279 |
| 2009/0187986 A1* | 7/2009 | Ozeki | 726/21 |
| 2009/0313694 A1* | 12/2009 | Mates | 726/21 |
| 2009/0328186 A1* | 12/2009 | Pollutro et al. | 726/13 |

FOREIGN PATENT DOCUMENTS

WO    02/13455    2/2002

OTHER PUBLICATIONS

Bruce Schneier, Applied Cryptography, 1996, John Wiley and Sons Inc., 2nd Edition, pp. 34-44.*

* cited by examiner

SECURE SIGNATURE SERVER SYSTEM AND ASSOCIATED METHOD

FIELD OF THE INVENTION

The present invention relates to securing software and data, and more particularly to securing software and data utilizing signatures.

BACKGROUND OF THE INVENTION

Public key encryption is based on encryption algorithms that have two keys. A first key is used for encryption, and a second key is used for decryption. In such systems, there is a known algorithm that computes the second key given the first. However, without full knowledge of all the parameters, one cannot compute the first key given the second key. The first key is referred to as the "private key", and the second key is referred to as the "public key". In practice, either the private key or the public key may be used to encrypt data and/or software, with the other key used to decrypt it. In general, the private key must be kept private, but the public key may be provided to anyone. A variety of public key cryptographic schemes have been developed for the protection of data and/or software communicated over networks via messages.

Public key systems are used for not only encrypting messages, but also effectively "signing" messages, allowing the received party to authenticate the sender of the message. One can also use such public key systems to seal or render tamper-proof a message. In such event, the sender computes a message digest from the data and/or software using specially designed cryptographically strong digests designed for this purpose. The sender then uses the private key to encrypt the message digest, wherein this encrypted message digest is called a digital "signature". The sender then packages the data and/or software, the message digest, and the public key together. The receiver may check for tampering by computing the message digest again, then decrypting the received message digest with the public key. If the recomputed and decrypted message digests are identical, there was no tampering of the data.

In the prior art, software such as pretty good privacy (PGP) software is often used to generate the aforementioned signature. Typically, this software must have direct access to a private key to create the signature. For example, a command such as "C:>pgp –ks data. file" is often used to accomplish this.

Unfortunately, the fact that such PGP software must have read access to the file system where the private key is stored means that the user running the PGP software must also have access to such data. In a typical working environment, multiple users may be alternating in the job of creating signatures. Unfortunately, this exposes the private key to theft.

The seriousness of such theft is exemplified in a situation involving wireless computers that are equipped with a public key "burned" in memory. In such a case, the security of the entire system may be compromised upon the theft of the private key, since there is no way of changing the public key in the wireless computers.

There is thus a need for a system of securely generating signatures without the risks associated with private key theft, especially in environments where the public key can not be changed in response to a compromise of the private key.

DISCLOSURE OF THE INVENTION

A system, method and computer program product are provided for securely generating signatures. Initially received is a request to generate a signature at a secure server. Then, the signature is automatically generated at the secure server utilizing a private key stored at the secure server. The signature is then transmitted from the secure server. Such signature is capable of being used to verify an authenticity of an update (i.e. data, software, etc.) for a computer utilizing a public key.

In one embodiment, the request may include authentication information. Still yet, the secure server may authenticate the request utilizing the authentication information. At any point, it may be determined at the secure server whether the authentication information has been compromised. If it is determined that the authentication information has been compromised, the authentication information may be invalidated.

In another embodiment, various logging may be carried out at the secure server. For example, the authentication information may be logged at the secure server. Moreover, the request may be logged at the secure server. Still yet, any connection with the secure server and/or related information may be logged at the secure server.

As an option, the update may include data and/or software. In one particular embodiment, the computer may be equipped with anti-virus software. In such embodiment, the update may include virus signatures for use in conjunction with the anti-virus software.

In still another embodiment, the update may be encrypted at the secure server utilizing the private key. Such update is decrypted at the computer utilizing the public key.

In still yet another embodiment, the signature may be transmitted from the secure server to the computer. Optionally, the computer may include a wireless computer. As a further option, the computer may include a client computer which, in turn, transmits the signature to a wireless computer.

From the perspective of a computer receiving updates, a technique for securely generating signatures is as follows. Initially, a request to generate a signature is sent to a secure server capable of automatically generating the signature at the secure server utilizing a private key stored at the secure server. The signature is then received from the secure server. An authenticity of an update may then be verified utilizing a public key.

As an option, a system, method and computer program product may be provided for securely encrypting an update (i.e. software and/or data). Initially, a request to encrypt the update is received. Such update is then automatically encrypted at the secure server utilizing a private key stored at the secure server. The encrypted update may then be transmitted from the secure server. In use, the update is capable of being decrypted at a computer utilizing a public key.

These and other advantages of the various embodiments will become apparent upon reading the following detailed description and studying the various figures of the drawings.

BRIEF DESCRIPTION OF THE DRAWINGS

The foregoing and other aspects and advantages are better understood from the following detailed description of the various embodiments with reference to the drawings.

DESCRIPTION OF THE PREFERRED EMBODIMENTS

Figure 1:
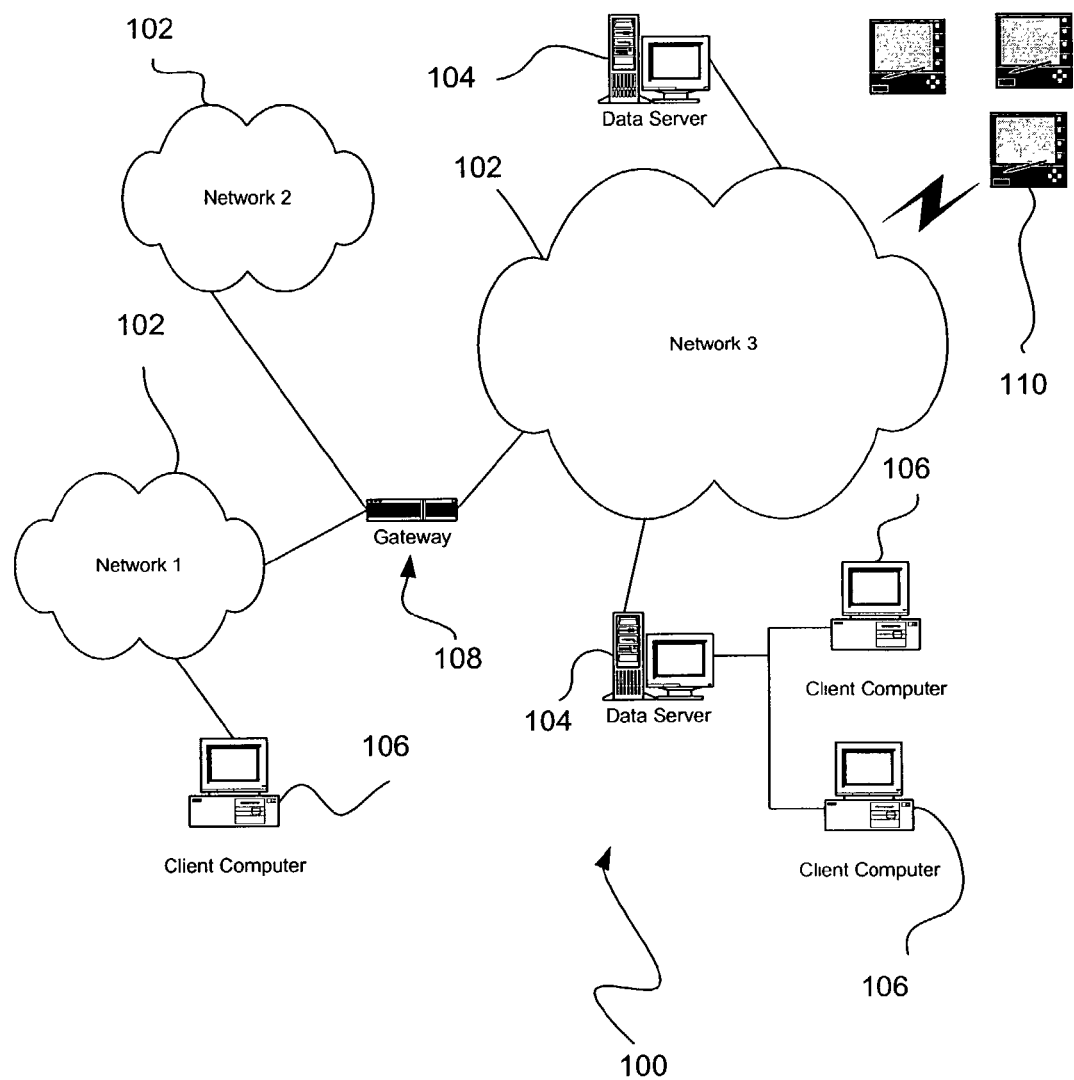
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. For reasons that will soon become apparent, at least one of the data server computers 104 may include a secure server. In the context of the present description, such secure server may be equipped with a private key, and operate in a manner that effectively prevents theft of the private key.

Also coupled to the networks 102 and the data server computers 104 is a plurality of client computers 106 which may include wireless computers 110. In the context of the present description, such wireless computers 110 may include any device (i.e. personal digital assistant (PDA), palm computer, digital phone, etc.) that is capable of communicating over the networks 102 in a wireless fashion.

In order to facilitate communication among the networks 102, at least one gateway 108 is coupled therebetween. It should be noted that each of the foregoing network devices as well as any other unillustrated devices may be interconnected by way of a plurality of network segments.

In the context of one embodiment, the client computers 106 and/or wireless computers 110 may be equipped with software that may require updating. Such updating may include data and/or software components for being processed and/or executed, respectively, utilizing the associated computer.

To avoid a situation where a third party attempts to update one of the computers with unauthorized/tampered software and/or data, each of the computers is equipped with a public key. In the case of the wireless computer 110, the public key may be stored in a non-rewriteable read only memory (ROM).

In use, the present network architecture 100 may authenticate the updates to the computers. This may be accomplished utilizing a signature generated using the private key and authenticated using the public key. Moreover, the signature may be generated in a secure manner that avoids the theft of the private key and comprise of the security of the updating process as a whole.

Specifically, this may be accomplished by securely generating signatures utilizing the secure server. Initially, a request is received to generate a signature at a secure server. The signature is then automatically generated at the secure server. The signature is subsequently transmitted from the secure server to a computer. Such signature is then capable of being used to verify the authenticity of an update for the computer. More information regarding various optional aspects of the present embodiment will be set forth hereinafter in greater detail.

Figure 2:
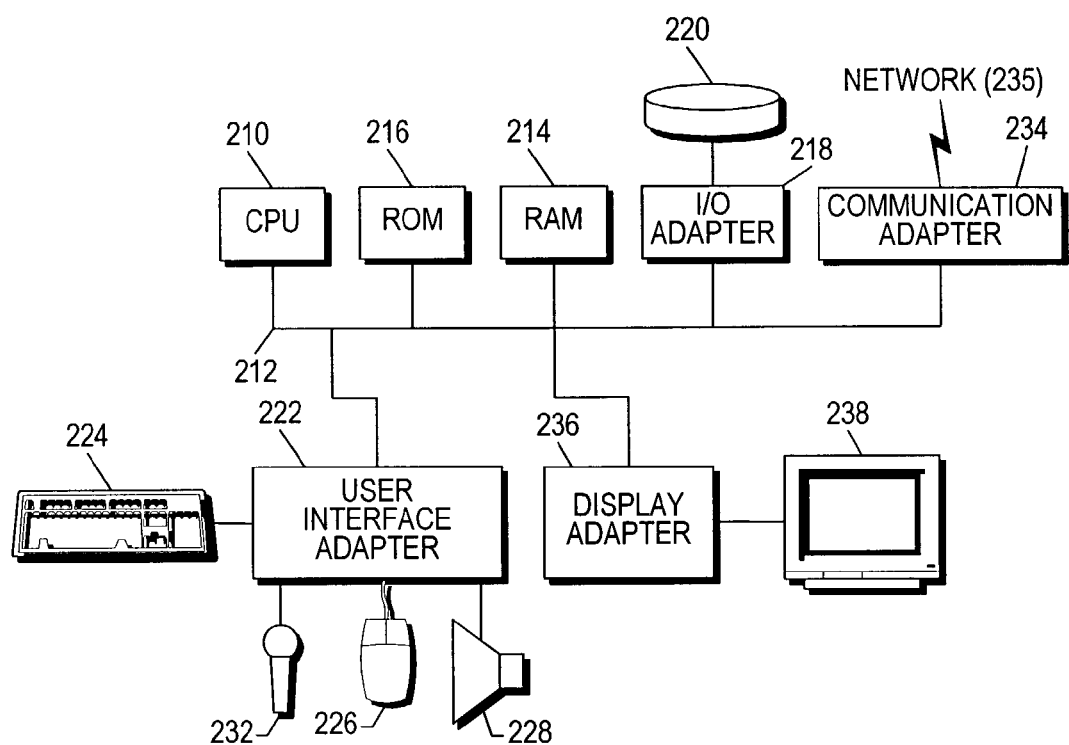
FIG. 2 shows a representative hardware environment that may be associated with the data servers and computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
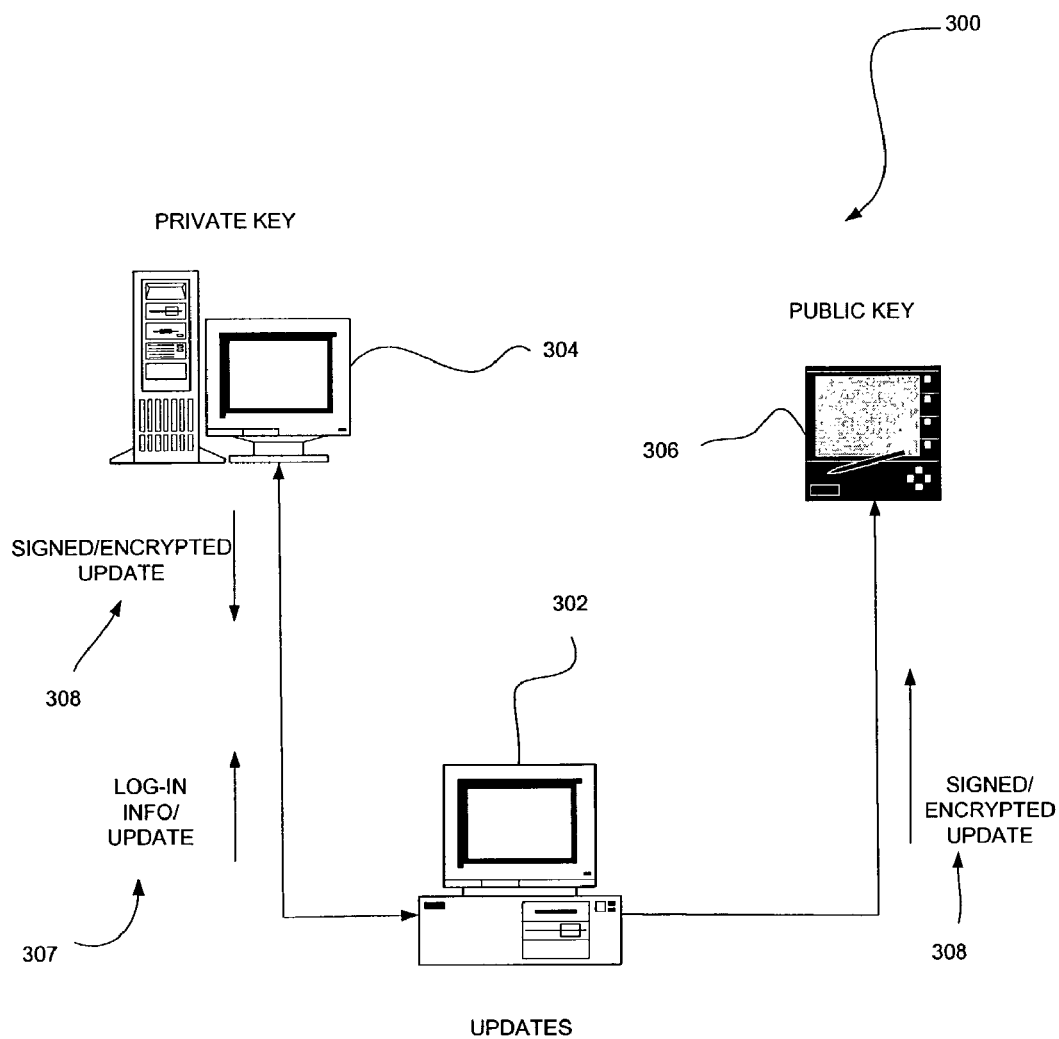
FIG. 3 illustrates an exemplary framework with which the present embodiment may be carried out.

FIG. 3 illustrates an exemplary framework 300 with which the present embodiment may be carried out. In one embodiment, the framework 300 may be implemented in the context of the aforementioned environment of FIGS. 1 and 2. Of course, the present framework 300 may be implemented in any desired context.

Included is a client computer 302 equipped with updates capable of being distributed to a plurality of wireless computers 306. Again, such updates may include data and/or software components for being processed and/or executed, respectively, utilizing the associated wireless computer 306. While a wireless computer 306 is shown in the present example to be in receipt of such updates, it should be noted that any type of computer may be equipped to receive the updates.

For reasons that will soon become apparent, the wireless computer 306 is further equipped with a public key that may be included in associated ROM. As an option, the client computer 302 may include a plurality of operator modules for governing the distribution of the updates.

In one exemplary embodiment, the software to be updated on the wireless computer 306 may include anti-virus software, and the updating may involve equipping the anti-virus software with updated virus signatures representative of any new virus threats. Of course, however, the software may involve any process that may be updated. Just by way of example, software updates in the form of newer versions, or mere data updates may fall within the scope of the present embodiment.

So that the authenticity of the updates may be verified during distribution between the client computer 302 and the wireless computers 306, the client computer 302 is coupled to a secure server 304 equipped with a securely stored, inaccessible private key. Unlike the prior art, such private key is stored in a manner that effectively prevents theft.

In particular, the client computer 302 logs into the secure server 304 after which an update (i.e. software, data, etc.) is sent thereto for being encrypted and "signed." See 307. This is accomplished by the secure server 304 automatically generating a signature and/or encrypting the update utilizing the private key. Since the private key at the secure server 304 is inaccessible to the client computer 302, and the signature generation process is automated and situated inside the secure server 304; there is a reduced chance that the private key will be compromised.

By this design, the encrypted update and signature 308 may then be transmitted to the client computer 302 for distribution to the wireless computer 306. To this end, the encrypted update and signature 308 may be authenticated and decrypted at the wireless computer 306 utilizing the public key with increased security.

It should be understood that the present embodiment is set forth for illustrative purposes only, and various modifications may be made. For example, either the client computer 302 or the wireless computers 306 (not necessarily wireless) may be excluded, combined, etc. per the desires of the user.

Figure 4:
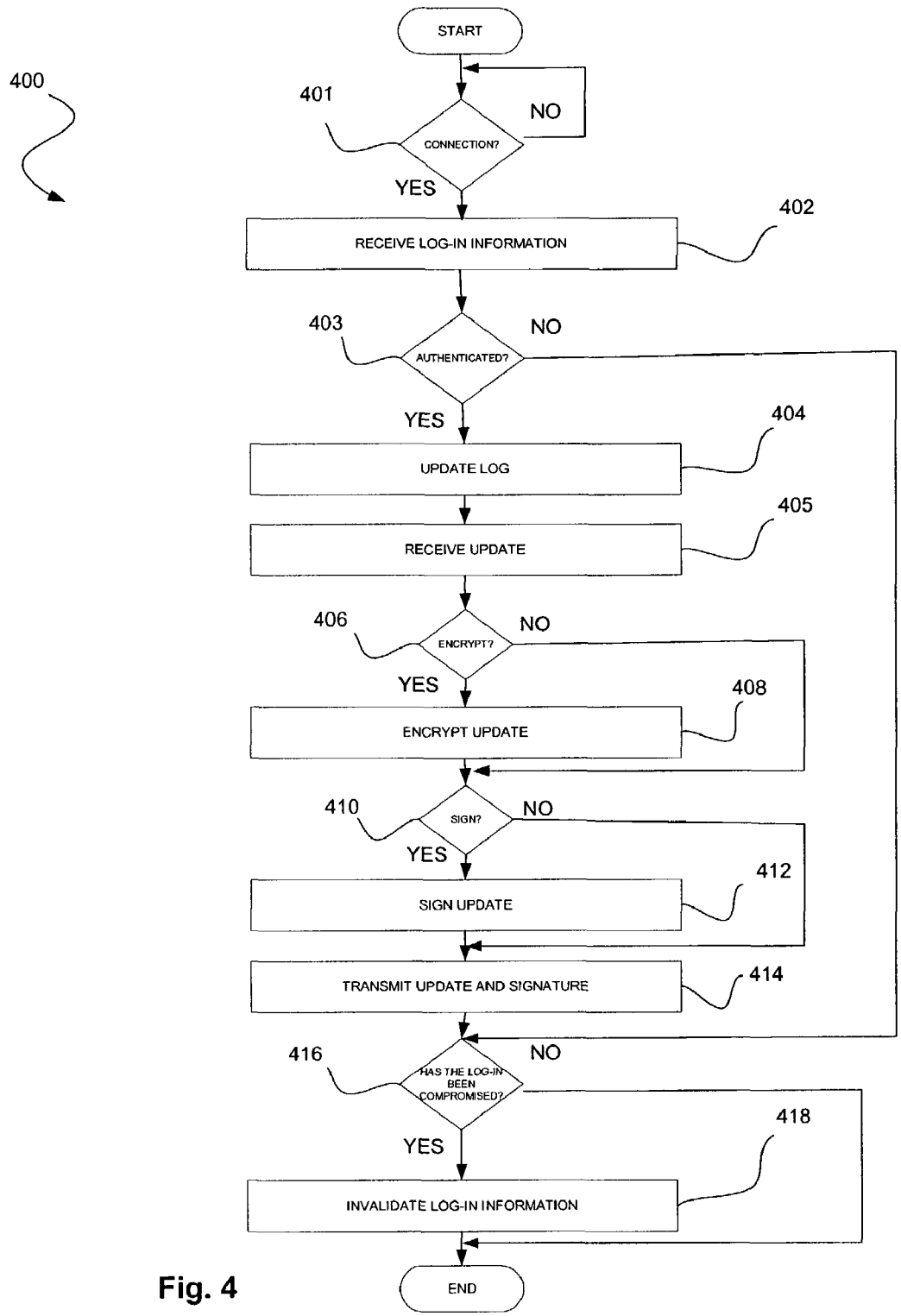
FIG. 4 shows a method of securely generating signatures, in accordance with one embodiment.

FIG. 4 shows a method 400 of securely generating signatures, in accordance with one embodiment. It should be noted that the present method 400 may be carried out using the network architecture of FIGS. 1 and 2, and/or even the framework 300 of FIG. 3. Of course, however, the present method 400 may be executed in any desired context and environment.

In decision 401, any connection between a computer and a secure server is initially identified. In the context of the embodiment of FIG. 3, such computer may include a client computer equipped with updates to be distributed to a plurality of other computers (i.e. wireless computers, etc.) in a secure manner. Of course, the computer connecting with the secure server may include any desired device.

Once the connection is identified in decision 401, log-in information is received in the form of a request to generate a signature along with authentication information. Note operation 402. Such authentication information may optionally take the form of a user name and/or password. Using this authentication information, the secure server then authenticates the computer. Note decision 403.

Various information may be logged during the present method 400. For example, the connection, request, and/or authentication information may be logged in operation 404. By tracking usage of the secure server via the logging, enhanced security options may be provided. For example, specific security actions may be documented and alleged perpetrators may be contacted, blocked, etc.

In operation 405, an update (i.e. software and/or data) is then received from the computer at the secure server. It is then determined whether the update is to be encrypted and/or signed in decisions 406 and 410, respectively. As an option, such decisions 406 and 410 may be based on instructions included with the log-in information. In accordance with such decisions 406 and 410, the update is then encrypted and/or signed in operations 408 and 412, respectively.

The encrypted update and the signature are then transmitted from the secure server to the computer. See operation 414. For additional security, it may be determined at the secure server whether the authentication information has been compromised. Note decision 416. Such authentication information may then be invalidated if it is determined that the authentication information has been compromised. Note operation 418. In one embodiment, the authentication information may be simply removed from an authorized list on the secure server.

To enhance the aforementioned authentication operation of operation 403, the secure server may be adapted to provide a random binary sequence upon the connection being established per decision 401. The accessing computer may then combine such random binary sequence with the authentication information in the form of a hash. This way, the chances of the authentication information being compromised is reduced. As an option, a "sigcln" program may be used to communicate with the secure server by using a custom protocol built on top of TCP/IP while avoiding private key exchange.

When the accessing computer connects to the secure server, it may receive a welcome string (i.e. "+OK<random-string>Secure Signature Server Welcome", where the random-string is a string randomly generated for each connection. The accessing computer extracts the random-string from the welcome string. The accessing computer then supplies the program with a user name and password that the program may use to perform the secure authentication. Specifically, it may build a string shown in Table 1.

TABLE 1

SHA1-string = password + blank + random-string where blank is a space character

Then, the program may create a SHA1 signature of the above string of Table 1 and send to the secure server a login string set forth in Table 2.

TABLE 2 login-string = user name + blank + sha1-hex where sha1-hex is the hexadecimal conversion of the SHA1 signature created above The signature server then receives the login string above and extracts the user name that will be used to lookup a local (for the server) password file that stores user name/password couples in the way set forth in Table 3.

TABLE 3 user name + colon + password where colon is the colon (:) character

If the supplied user name does not exist, the secure server returns an access denied response. If the user name is found, the server extracts the password that will be used to prepare the SHA1-string together with the random-string.

The secure server then computes the SHA1 signature of the SHA1-string and compares the result with the one extracted from the login-string. If there is no match, the secure server returns an access denied response. Otherwise, it returns an access granted response. In both cases, the result is logged inside a secure server log file together with other useful information such as IP address, user name, etc.

By this design, the signature may be distributed with the encrypted data from the computer to a wireless computer equipped a public key for authenticating the signature and decrypting the data.

In any case, the signature is generated while avoiding a user or application associated with the client computer from having direct access to the private key. By using the secure server, the private key may be stored in a manner completely isolated in terms of services running and no user (or limited users) may have access to it.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for securely generating signatures, comprising:
   receiving, at a secure server from a first computer, a request including authentication information to generate a signature at the secure server;
   receiving, at the secure server from the first computer, an update for a second computer in association with the request;
   determining at the secure server whether the authentication information has been compromised;
   generating, in response to the request, the signature utilizing a private key stored at the secure server, and further encrypting the update after receipt of the request and the update at the secure server, the encrypting utilizing the private key;
   transmitting the signature and the encrypted update from the secure server to the first computer;
   distributing the encrypted update and the signature from the first computer to the second computer; and
   utilizing the signature, verifying an authenticity of the encrypted update for the second computer utilizing a public key, the private key at the secure server being inaccessible to the first computer and the second computer.

2. The method as recited in claim 1, wherein the secure server authenticates the request utilizing the authentication information.

3. The method as recited in claim 1, wherein the authentication information is invalidated if it is determined that the authentication information has been compromised.

4. The method as recited in claim 1, wherein the authentication information is logged at the secure server.

5. The method as recited in claim 1, wherein the request is logged at the secure server.

6. The method as recited in claim 1, wherein a connection with the secure server is logged at the secure server.

7. The method as recited in claim 1, wherein the encrypted update includes virus signature data.

8. The method as recited in claim 1, wherein the encrypted update includes software.

9. The method as recited in claim 1, wherein the first computer and the second computer are equipped with anti-virus software.

10. The method as recited in claim 9, wherein the encrypted update includes virus signatures for use in conjunction with the anti-virus software.

11. A computer program product embodied on a non-transitory computer readable medium comprising instructions stored thereon to cause one or more processors to:
    receive, at a secure server from a first computer, a request including authentication information to generate a signature at the secure server;
    receive, from the first computer at the secure server, an update for a second computer in association with the request;
    determine at the secure server whether the authentication information has been compromised;
    generate, in response to the request, the signature utilizing a private key stored at the secure server, and further encrypt the update after receipt of the request and the update at the secure server, the encryption utilizing the private key;
    transmit the signature and the encrypted update from the secure server to the first computer;
    distribute the encrypted update and the signature from the first computer to the second computer; and
    verify based on the signature an authenticity of the encrypted update for the second computer utilizing a public key, the private key at the secure server being inaccessible to the first computer and the second computer.

12. A system for securely generating signatures, comprising:
    a memory for storing computer instructions; and
    one or more processing units communicatively coupled to the memory and configured to:
    receive, at a secure server from a first computer, a request including authentication information to generate a signature at the secure server;
    receive, at the secure server from the first computer, an update for a second computer in association with the request;
    determine at the secure server whether the authentication information has been compromised;
    generate, in response to the request, the signature utilizing a signature generation process which utilizes a private key stored at the secure server, and further encrypt the update after receipt of the request and the update at the secure server, the encryption utilizing the private key;
    transmit the signature and the encrypted update from the secure server to the first computer;
    distribute the encrypted update and the signature from the first computer to the second computer; and
    verify based on the signature an authenticity of the encrypted update for the second computer utilizing a public key, the private key at the secure server being inaccessible to the first computer and the second computer.

13. A method for securely generating signatures, comprising:
    identifying a connection between a computer and a secure server;
    receiving from the computer a request to generate a signature at the secure server, the request including authentication information;
    authenticating the computer utilizing the authentication information at the secure server;
    logging the connection, request, and authentication information at the secure server;
    receiving from the computer an update at the secure server;
    encrypting the update at the secure server utilizing a private key stored at the secure server;
    generating the signature for the encrypted update at the secure server utilizing the private key;
    transmitting the encrypted update and the signature from the secure server to the computer;
    determining at the secure server whether the authentication information has been compromised;
    invalidating the authentication information if it is determined that the authentication information has been compromised; and
    distributing the signature with the encrypted update from the computer to a wireless computer equipped with a public key for authenticating the signature and decrypting the encrypted update, the private key at the secure server being inaccessible to the computer.

14. The method as recited in claim 2, wherein the secure server transmits a welcome string including a string randomly generated for each of a plurality of connections.

15. The method as recited in claim 2, wherein the secure server receives the authentication information from the first computer.

16. The method as recited in claim 15, wherein the authentication information includes a login string comprised of a user name and a SHA1-hex conversion.

17. The method as recited in claim 16, wherein the SHA1-hex conversion corresponds to a SHA1 signature of a password and a randomly generated string randomly generated for each of a plurality of connections.

18. The method as recited in claim 16, wherein the user name is looked up in a local password file containing name and password couples.

\* \* \* \* \*